US012694163B2

(12) United States Patent
Diego Gutierrez et al.

(10) Patent No.: US 12,694,163 B2
(45) Date of Patent: Jul. 28, 2026

(54) DIMENSIONS IN ADDITIVE MANUFACTURING

(71) Applicant: Peridot Print LLC, Palo Alto, CA (US)

(72) Inventors: Victor Diego Gutierrez, Sant Cugat del Valles (ES); Manuel Freire Garcia, Sant Cugat del Valles (ES); Enrique Gurdiel Gonzalez, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 641 days.

(21) Appl. No.: 17/418,792

(22) PCT Filed: Oct. 24, 2019

(86) PCT No.: PCT/US2019/057853
§ 371 (c)(1),
(2) Date: Jun. 26, 2021

(87) PCT Pub. No.: WO2020/222863
PCT Pub. Date: Nov. 5, 2020

(65) Prior Publication Data
US 2022/0067225 A1       Mar. 3, 2022

Related U.S. Application Data

(63) Continuation-in-part of application No. PCT/US2019/029839, filed on Apr. 30, 2019.

(51) Int. Cl.
*G06F 30/10*       (2020.01)
*B29C 64/386*       (2017.01)
(Continued)

(52) U.S. Cl.
CPC ............ *G06F 30/10* (2020.01); *B29C 64/386* (2017.08); *B33Y 50/00* (2014.12);
(Continued)

(58) Field of Classification Search
CPC .. G06F 30/10; G06F 2111/10; G06F 2119/01; B29C 64/386; B33Y 50/00; G05B 19/40931; G05B 2219/35148
See application file for complete search history.

(56) References Cited

U.S. PATENT DOCUMENTS 11,597,153 B1      3/2023    Barbati et al.
2003/0151167 A1    8/2003    Kritchman et al.
(Continued)

FOREIGN PATENT DOCUMENTS

WO    WO-2018140034        8/2018
WO    2018/182513 A1    10/2018
(Continued)

OTHER PUBLICATIONS

Wang, A., Song, S., Huang, Q., & Tsung, F. (2016). In-plane shape-deviation modeling and compensation for fused deposition modeling processes. IEEE Transactions on Automation Science and Engineering, 14(2), 968-976. (Year: 2016).*
(Continued)

*Primary Examiner* — Bijan Mapar
(74) *Attorney, Agent, or Firm* — Michael Dryja

(57)       ABSTRACT

An example method includes obtaining, by at least one processor, a plurality of categorised indications of deviations from expected dimensions for at least one object generated using an additive manufacturing apparatus wherein the categories comprise at least two of a first dimension type comprising dimensions which are expected to increase on application of a positive offset to object model data used to generate an object, a second dimension type comprising
(Continued)

dimensions which are expected to decrease on application of a positive offset to the object to object model data used to generate an object, and a third dimension type comprising dimensions which are expected to be unaffected by application of an offset to object model data used to generate an object. The method may include determining a geometrical compensation model to apply to object model data for generating objects using additive manufacturing to compensate for anticipated deviations in dimensions.

19 Claims, 6 Drawing Sheets

(51) Int. Cl.

| | | |
|---|---|---|
| *B33Y 50/00* | (2015.01) | |
| *G05B 19/4093* | (2006.01) | |
| *G06F 111/10* | (2020.01) | |
| *G06F 119/18* | (2020.01) | |

(52) U.S. Cl.
CPC .................. *G05B 19/40931* (2013.01); *G05B 2219/35148* (2013.01); *G06F 2111/10* (2020.01); *G06F 2119/18* (2020.01)

(56) References Cited

U.S. PATENT DOCUMENTS

| | | |
|---|---|---|
| 2016/0320771 A1 | 11/2016 | Huang |
| 2017/0239719 A1* | 8/2017 | Buller ..................... B22F 12/49 |
| 2017/0310935 A1 | 10/2017 | Sinclair |
| 2017/0332976 A1 | 11/2017 | Al-Ali |
| 2017/0368753 A1 | 12/2017 | Yang et al. |
| 2017/0369753 A1 | 12/2017 | Demmons et al. |
| 2018/0040131 A1 | 2/2018 | Zeng et al. |
| 2018/0095450 A1 | 4/2018 | Lappas et al. |
| 2018/0250774 A1 | 9/2018 | Symeonidis et al. |
| 2019/0054700 A1 | 2/2019 | Chandar et al. |

FOREIGN PATENT DOCUMENTS

| | | | | |
|---|---|---|---|---|
| WO | WO-2018194623 A1 | 10/2018 | | |
| WO | WO-2018209886 A1 * | 11/2018 | ....... | G06K 19/06159 |

OTHER PUBLICATIONS

Mueller, J., & Shea, K. (2015). The effect of build orientation on the mechanical properties in inkjet 3D printing. In 2015 International Solid Freeform Fabrication Symposium. University of Texas at Austin. (Year: 2015).*

Lemu et al., 3D Printing for Rapid Manufacturing; Study of Dimensional and Geometrical Accuracy, 2012, 10 pages.

Kacmarcik et al., An Investigation of geometrical accuracy of desktop 3D printer using CMM, 2018, 10 Pages.

Dimensional Accuracy Achievable by three dimensional printing, Apr. 2014, 6 pages.

Dimensional Accuracy Optimization of Prototypes produced by Polyjet Direct 3D Printing Technology, Jul. 2014, 6 Pages.

"Size difference from software to print?," Simplify3D User Forum, retrieved at https://forum.simplify3d.com/viewtopic.php?f=9&t=6130, retrieved on Mar. 31, 2022, 6 pages.

Islam, N., "An experimental investigation into the dimensional error of powder-binder three-dimensional printing," The International Journal of Advanced Manufacturing Technology, Feb. 2016, vol. 82, Issue 5-8, pp. 1371-1380.

Yaman, U., "Shrinkage compensation of holes via shrinkage of interior structure in FDM process," The International Journal of Advanced Manufacturing Technology, Feb. 2018, vol. 94, Issue 5-8, pp. 2187-2197.

* cited by examiner

| Obtain plurality of categorised indications of deviations from expected dimensions | 102 |

| Determine geometrical compensation model based on obtained indications and associated category | 104 |

Obtain plurality of categorised indications of deviations from expected dimensions 402

Perform linear regression by minimising sum of functions 404

Apply the geometrical compensation model to the object model data 406

Generate object based on modified object model data 408

500
Apparatus

502
Processing Circuitry

504
Geometrical Compensation Module

DIMENSIONS IN ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
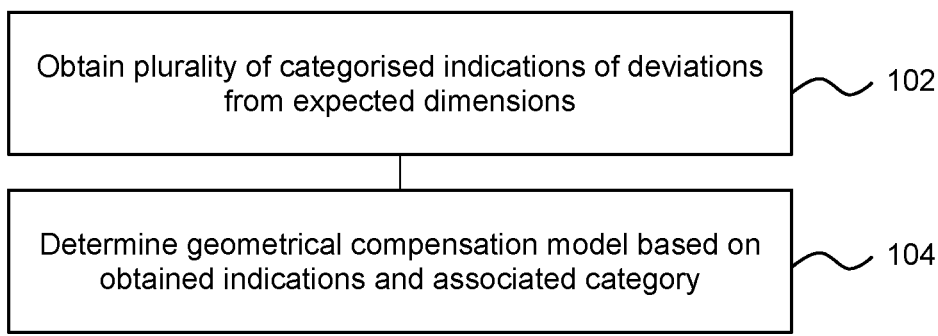
FIG. 1 is a flowchart of an example of a method of determining a geometrical compensation model.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat in a thermal fusing additive manufacturing operation. This may comprise directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In one example such a fusing agent may comprise any or any combination of an infra-red light absorber, a near infra-red light absorber, a visible light absorber and a UV light absorber. Examples of print agents comprising visible light absorption enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed to reduce or prevent coalescence by, for example, cooling the build material or through some other mechanism. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to derive slices of parallel planes of the model. Each slice may define a portion of a respective layer of build material that is to be solidified or caused to coalesce by the additive manufacturing system.

FIG. 1 is an example of a method, which may comprise a computer implemented method of determining a geometrical compensation model, which may, for example, be used to modify object model data. The object model data may be modified to compensate for anticipated deviations in dimensions when generating an object.

In some examples, geometrical transformations may be used to derive modifications of object model data, for example to apply a geometrical compensation in order to compensate for anticipated deviations in dimensions when generating an object.

For example, it may be the case that, where an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the regions to which fusing agent is applied. In order to compensate for this effect, i.e. where it is anticipated that an object may tend to 'grow' during manufacture in this manner, the object volume as described in object model data may be reduced to compensate for such growth.

In other examples, objects may be smaller following object generation than is specified in object model data. For example, some build materials used to generate objects may shrink on cooling. Therefore, a geometrical compensation/transformation model may specify at least one geometrical compensation parameter to in turn specify how an object volume in object model data may be increased to compensate for the anticipated reduction in volume.

A particular object may be subject to mechanisms which result in growth and/or shrinkage, and the appropriate transformation to apply may be influenced by the different degrees to which an object may be affected by such processes.

Geometrical compensation models may specify at least one scaling factor and/or at least one offset value, and in some examples associate a scaling factor and/or offset value with one of three orthogonal (e.g. x, y and z) axes. For example, a scaling factor may be used to multiply dimensions in the direction of an axis by a value, which may be greater than 1 in order to increase the dimensions and less than 1 to reduce the dimensions. An offset value may specify, for example by a specified distance (which may be specified in predefined units, for example standard units such as millimeters or addressable units such as pixels or 'voxels' as are discussed in greater detail below), an amount to add or remove from a surface of the object (or a perimeter within a layer). For example, a distance as measured in the direction of a normal from the object surface may be specified and the object may be eroded or dilated (i.e., inflated or enlarged) by this distance. The offset value may therefore be referred to as a surface offset, or a surface offset value. Therefore, in order to compensate for an anticipated deviation in a given axis, a scaling factor and/or offset value may be used.

The method of FIG. 1 comprises, in block 102, obtaining, by at least one processor, a plurality of categorised indications of deviations from expected dimensions for at least one object generated using an additive manufacturing apparatus. The categories comprises at least two of a first dimension type, a second dimension type and a third dimension type. Examples of the first, second and third dimension types are described in more detail in relation to FIG. 2, but in summary comprise respectively (i) object dimensions which may be expected to increase with the application of a positive surface offset to underlying object model data, (ii) object dimensions that may be expected to decrease with the application of a positive surface offset to underlying object model data and (iii) object dimensions which may be expected to be unchanged by application of a surface offset. The indications of deviations may be predetermined, for example obtained from a memory, or over a communications link. In some examples, the indications of deviations may be obtained or determined by measuring at least one dimension of an object generated according to object model data and comparing the measured dimension with an expected dimension e.g., by subtracting the expected dimension from the measured dimension. In some examples, indications of a plurality of deviations of dimensions of at least one object (and in some examples, a plurality of objects) are determined. For example, these dimensions may be measured by a 3D scanner, manually, optically, automatically or in some other way. In other examples, the indications of deviations may comprise the measurements themselves, which may then be compared to expected measurements. The measurements/indications of deviations may for example be received from a memory, or over a communications link, or may be determined directly by the processor(s).

Different dimensions of the object are impacted differently to application of offsets. For example a dimension measured between two faces which face in opposing directions will be expected to increase when a positive offset is applied to object model data (and an object generated based on the object model data) when compared to the dimension without the offset being applied to the object model data, whereas a dimension measured between two faces which face towards each other will be expected to decrease when a positive offset is applied to underlying object model data.

In both these examples, an offset may be applied to the object model with respect to both ends of the dimension under consideration. For example (ignoring scaling factors at present) if the object has a square cross section and modelled objects have been shown to be 1 mm smaller than intended, it may be the case that a 1 mm offset is to be applied to object model data so that the object, when formed, is closer to the intended size. The offset of 1 mm may in practice be achieved by 'adding' a 0.5 mm offset to each of two opposed outer faces in object model data. Alternatively, if an object includes a square hole or hollow and modelled objects have generally had a hole which is larger than expected by 1 mm, a positive offset of 1 mm may be applied to object model data to move the faces of the square hole closer together, each moving 0.5 mm.

However, not all dimensions of interest include two endpoints which are both affected by offsets. For example, a dimension of interest may be between the center of a hole in the object and an object surface. If an offset is applied to the object, the center of the hole may be unaffected. Thus, in this case, to achieve a 1 mm change in the dimension, the object surface would have to move 1 mm. If the dimension of interest is between the centers of two holes, then the dimension may not change at all when offsets are applied (although deviations in such dimensions could be compensated for with scaling factors).

In addition to holes, a similar consideration may apply to surface features, such as a color boundary or the like. For example, it may be intended to precisely place a marking—for example a barcode or the like—a specified distance from the edge of objects for consistency and/or to aid automatic handling thereof. A measurement of the specified distance will be affected by an offset, but just at one end thereof. The size of the marking may also be of interest to a user, but this will not be impacted by a surface offset. It may again be noted that the size of the marking may be impacted by scaling.

The third category of dimensions is therefore those which are unaffected by application of an offset, for example the size of a marking, a distance measured from a center or other point within a face, or between the center of two holes.

The indications of deviations may not include dimensions of each category type in all examples. For example, the indications of deviations may all be in the first category type, or all in the second category type, or all in the third category type, or may be in two categories type without any indications of deviations of the remaining category type. However, in some methods described herein, the plurality of indications include at least one dimension measured from a point which is unaffected by application of an offset. It may be noted that such measurements may fall into the first or second category type if one end is unaffected by an offset or, if neither end is affected by application of an offset, the third category type. If such dimensions are not accurate it may adversely affect the object being generated, for example these dimensions may relate to the position of holes or protrusions used for assembly of objects and so may have a tolerance. For example, this may be around +/−0.2 mm or +/−0.3 mm.

Block 104 comprises determining, using at least one processor (which may be the same as the processor(s) referred to in relation to block 102) and based on the obtained indications and the associated category, a geometrical compensation model to apply to object model data for generating objects using additive manufacturing to compensate for anticipated deviations in dimensions. The geometrical compensation model may be a model which when applied to object model data for generating an object results in modified object model data which when used to generate an object in an additive manufacturing process is intended to result in a generated object of improved dimensional accuracy.

Such object model data may for example comprise data representing at least a portion (in some examples, a slice) of an object to be generated by an additive manufacturing apparatus by fusing a build material. The object model data may for example comprise a Computer Aided Design (CAD) model, and/or may for example be a STereoLithographic (STL) data file. In some examples, the object model data may represent the object or object portion as a plurality of sub-volumes, wherein each sub-volume represents a region of the object which is individually addressable in object generation. In some examples herein, the sub-volumes may be referred to as voxels, i.e. three-dimensional pixels. In other examples, the model may comprise an implicit model (for example being defined mathematically using models such as Non-uniform rational basis spline (NURBS)), a beam lattice model, a constructive solid geometry (CSG) model, or the like. The object may be described in the context of a space, and therefore may explicitly or implicitly describe a volume of space containing the object, including space that is external thereto.

If all the dimensions were to contribute to a model naively, i.e. without considering the category thereof, they could result in a poor model. Therefore, one alternative may be to consider just one type of measurement—for example, just external dimensions—but this may ignore dimensions which are of particular relevance to a user, and in any case reduces the number of dimensions which may contribute to a model. By considering the category, and building a compensation model based on the category, more dimension types may be considered. For example, this compensation model may include a scaling value which is determined to provide a compensation which is tailored to a combination of different dimension types, and better overall compensation with a single offset value may be achieved.

Figure 2A:
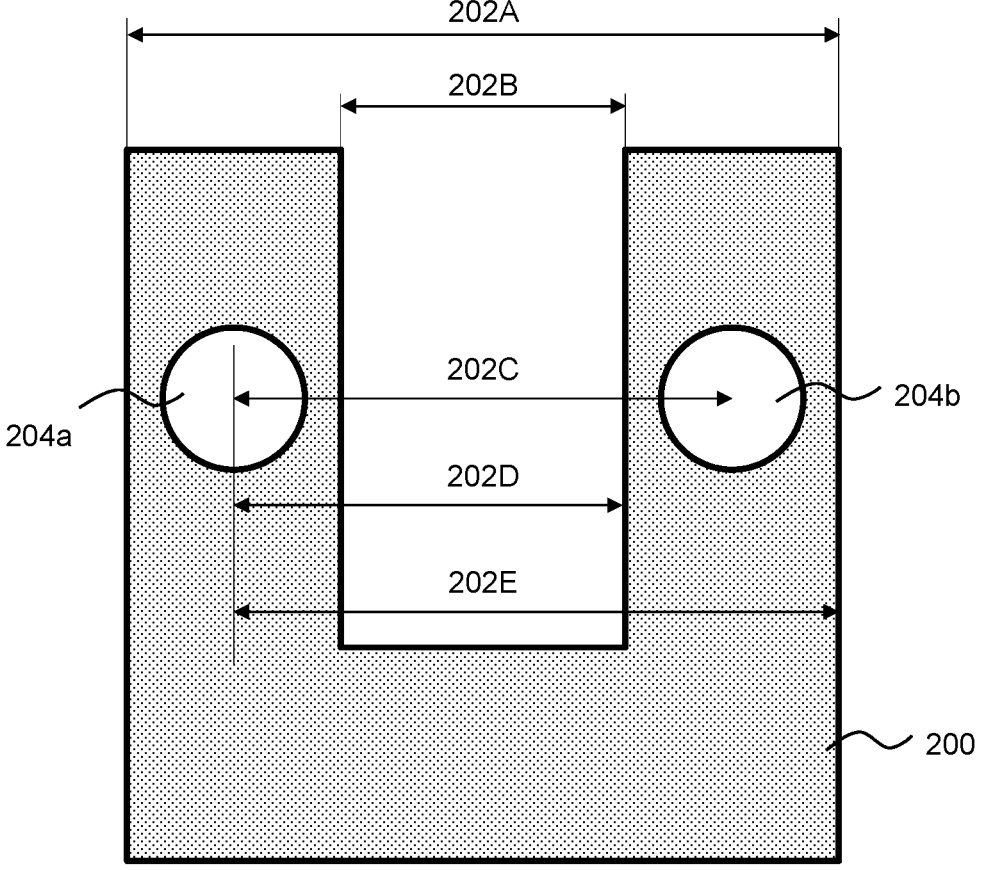
FIGS. 2A and 2B show schematic representations of example objects.
Figure 2B:
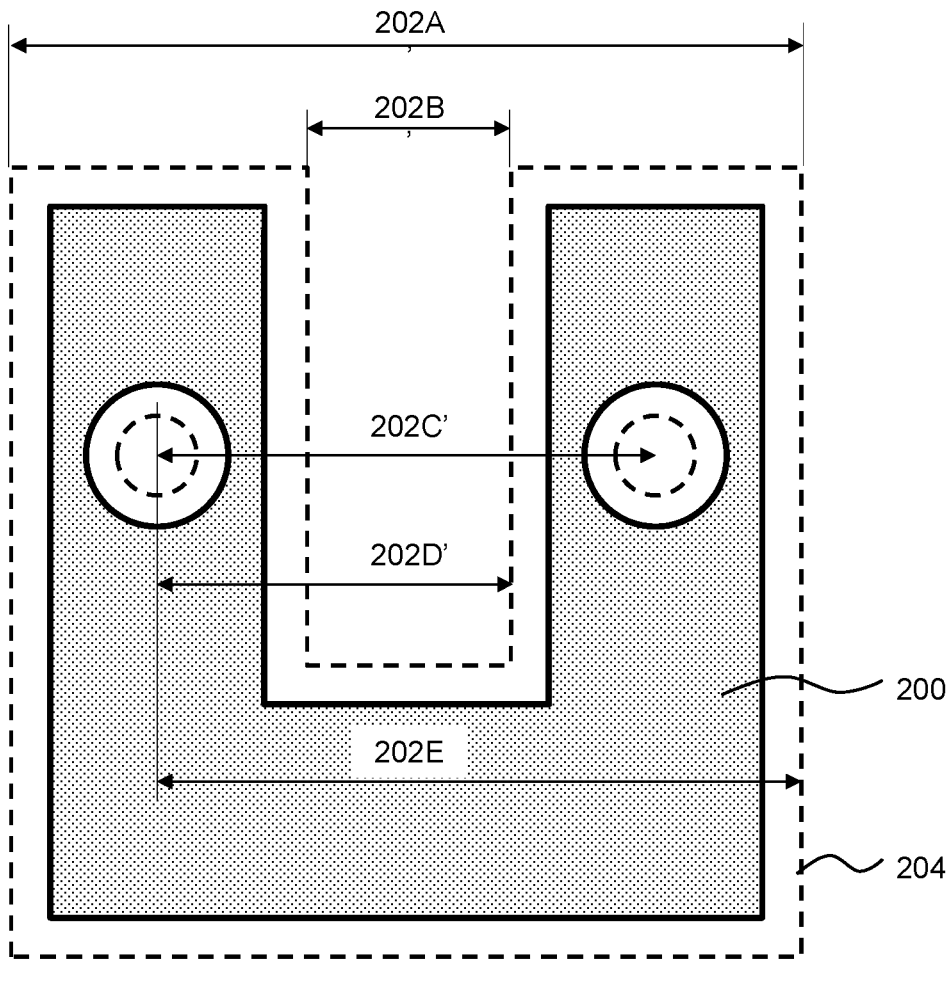

An example of an object with a number of dimensions in different categories is shown in FIGS. 2A and 2B. FIG. 2A depicts a cross-section of an example object 200 generated based on initial, or unmodified, object model data. Dimensions 202A-202E are indicated on the figure. In some examples, the dimension categories may be labelled (for example, identified and 'tagged' by a user).

The width 202A of the object 200 may be considered an external dimension. External dimensions may for example include those which are formed between surfaces which may be associated with a normal vector directed away from the respective surface of the object which would not intersect. In this case, such a normal vector would be formed from the left face and the right face of the object, and would not intersect.

However, the width 202B of an aperture between vertical arms of the object may be considered to represent an internal dimension (e.g. when measured from an internal side to the opposite internal side of the aperture) of the object 200. In this case, the corresponding normal vectors could intersect.

The inventors have realised that there may be circumstances where a geometrical compensation is to be applied to object model data for generating an object with external dimensions, internal dimensions and/or dimensions from a 'non-surface', or 'non-offset-affected' point, and that existing models may not handle these appropriately. For example, while the geometrical compensation model may compensate for some anticipated deviations (for example, at least one external dimension by considering deviations in external measurement of previous objects), this same geometrical compensation model may not necessarily appropriately compensate for anticipated deviations to dimensions in other categories. In other words, if just external dimensions are considered when generating a compensation, a generated object that is intended to achieve a certain dimensional tolerance may be less likely to achieve this dimensional tolerance for dimensions in other categories, such as those measured from a non-surface point of the object. However, for example where a hole or protrusion is to receive or interface with another part with a precision fit, it may be the case that the accuracy of measurements from non-surface points is a high priority.

The object 200 further comprises two holes 204a, 204b. The distance between the centre of the two holes 204a, 204b is neither an internal nor an external dimension. The center of the holes is a non-surface point, and therefore there is no normal associated with the end points of the measurement. Other measurements may also be made with non-surface end points, for example the distance between a hole 204a and face. A first example of such a measurement is dimension 202D which is measured between the center of the hole 204a and a face, wherein the face has a normal towards the hole 204a. A second example of such a measurement is dimension 202E which is measured between the center of the hole 204a and a face, wherein the face has a normal facing away from the hole 204a.

FIG. 2B shows an example of dimensions of a 'modified' object 204 which is obtained by applying a positive offset to the initial object model data, i.e. the modified object is generated based on modified object model data. It will be appreciated that this is an idealised example, in which an offset modification applied to object model data has been exactly reproduced in the object generated based on that data. This may not be the case in practical examples.

It can be seen that the external widths of the modified object 204 have increased relative to the same dimensions of the object 200 and that the internal dimensions and the diameter of the holes 204a, 204b have decreased.

The modified width 202A' of the modified object 204 has increased relative to the width 202A of the object 200 prior to application of the offset to the underlying object model data. External dimensions such as this increase on application of a positive offset, and therefore the width 202A is a dimension of the first dimension type. Conversely when a negative offset is applied, these dimensions are expected to decrease.

The measurement of dimension 202E between the centre of the hole 204a and an external face, wherein the external face faces away from the hole also increases on application of the offset to become dimension 202E'. Therefore, this dimension 202E is also a dimension of the first dimension type. The position of the center of the hole 204a does not change on application of the offset, therefore the amount by which this dimension 202E' increases is half of the increase in dimension 202A'.

The modified width 202B' of the aperture of the modified object 204 has decreased relative to the width 202B of the object 200 prior to application of the offset. Internal dimensions such as this are expected to decrease on application of a positive offset to object model data (when compared to objects generated based on object model data without the offset applied), and therefore the width 202B is a dimension of the second type.

The measurement 202D between the centre of the hole 204a and an internal face, wherein the internal face faces towards the hole also decrease on application of the offset to become dimension 202D'. Therefore this dimension 202D' is also a dimension of the second dimension type. As described above, the position of the center of the hole 204a does not change, therefore the amount by which the dimension 202D' decreases is half of the increase in dimension 202A'.

The distance 202C between the centre of the first hole 204a and the centre of the second hole 204b does not change on application of the offset, since the position of the centre of holes 204a, 204b does not change when the offset is applied. Therefore the distance 202C is a dimension of the third dimension type and the dimension 202C is equal to 202C'.

In some examples the method may further comprise categorising the first dimension type into external dimensions (such as dimension 202A, referred to herein as 'category A') or dimensions between one non-surface point and one external face point (such as dimension 202E, referred to herein as 'category E'). In some examples the method may further comprise categorising the second dimension type into internal dimensions (such as dimension 202B, referred to herein as 'category B') or dimensions between one non-surface point and one internal face point (such as dimension 202D, referred to herein as 'category D'). In some examples the third dimension type comprises dimensions between two non-surface points (such as dimension 202C, referred to herein as 'category C'). Thus, there may be more than one category in a category type. Each of these dimension categories behaves differently when an offset is applied to the object 200. External dimensions 202A and internal dimensions 202B are expected to increase and decrease respectively by an amount equal to the size of the offset applied. Dimensions between a non-surface point and an external face point 202E and dimensions between a non-surface point and an internal face point 202D are expected to increase and decrease respectively by an amount equal to half the offset applied to object model data. Dimensions between two non-surface points 202C do not change when an offset is applied to the object model data used to generate the initial object 200. Therefore, the different categories of dimensions can be treated differently to provide a better estimate of the offset value to apply.

In the example shown in FIGS. 2A and 2B the non-surface points comprise a center of a hole in the object. In other examples the non-surface points may comprise a centroid (or any other identifiable location) of a geometrical feature of the object. For example, rather than a hole the centroid may be the centre of a square feature, a circular feature, a rectangular feature, or any other shape of feature. The geometrical feature may be a hole or a protrusion of any shape. In other examples, the non-surface point may relate to a 2D marking. Where the geometrical feature is a hole it may be a through-hole extending through the entirety of the object, or it may be a depression in a surface of the object which does not extend through the entire body of the object.

For completeness, while it may be expected that, if an offset is applied to object model data, dimensions of an object may change in a particular direction, and indeed, may be expected theoretically to change by an amount related precisely to the offset value (e.g. by the offset or half the offset, as explained above), this may not be seen in all cases. There may be other factors, such as thermal interactions during object generation, which mean that this expectation is not always met.

FIGS. 3A to 3E depict graphs showing measurements corresponding to each category of dimension A, B, C, D and E respectively. The horizontal axis of each graph corresponds to the expected, or nominal, dimension in millimeters (mm) and the vertical axis corresponds to the measured deviations from expected dimensions in mm. In some examples, the indications of deviations may all relate to a single axis, for example to dimensions aligned with one of the x, y and z axis, and used to determine values for that axis. Thus, scaling and offset values may be obtained separately for the different axes, and may be different for the different axes. However, in other examples, dimensions oriented in more than one axis may be considered. The spread of deviations increases with increasing nominal value in these examples, as deviations in this example are cumulative in nature. Moreover, as can be seen in each graph, the deviations from the expected measurements increase substantially linearly as the size of the expected measurements increase.

While a linear regression may be performed for each graph to determine the 'best fit' straight line for each category individually (as is further set out below), in this example, a regression has been performed on all the measurements, such that a single offset factor and single scaling factor are determined for use in modifying object model data by finding a single offset factor and a single scaling factor which results in the best overall fit for the data shown in FIGS. 3A to 3E. This 'best fit' is shown using the dotted trendline in the graphs. While the trendlines are based on the same scaling and offset factor, they have different forms depending on the category.

Figures 3A, 3B, 3C, 3D, 3E:
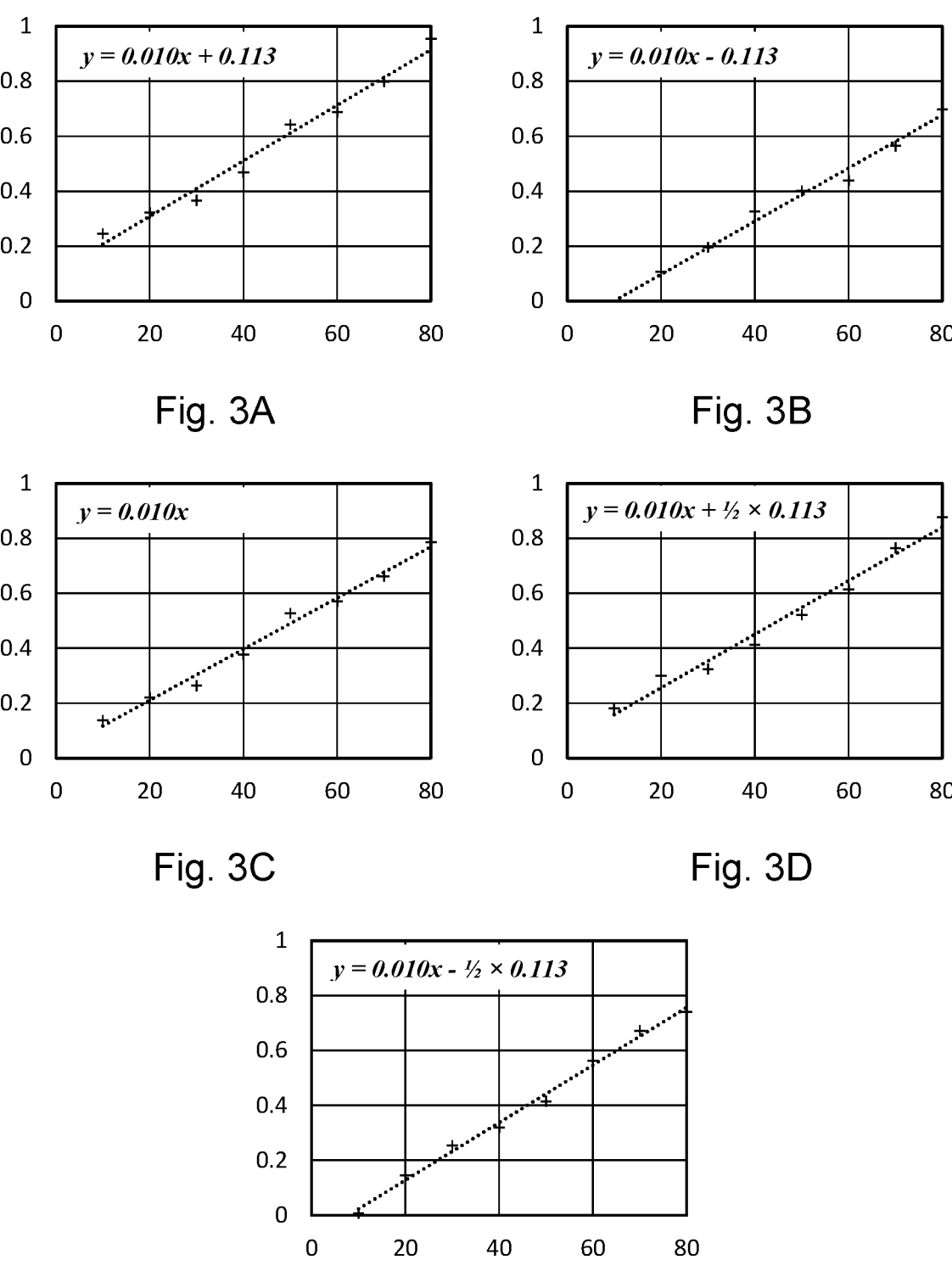
FIGS. 3A to 3E are example scatter graphs showing data representative of measured dimensions of an object.

In FIG. 3A category A measurements are shown. In this example the trendline has the form y=0.010x+0.113. This indicates that a geometrical compensation model which could be applied to this data which would correct for the deviations from the expected measurements would comprise applying a scaling of 0.010 an offset of 0.113 mm.

FIGS. 3B to 3E show similar graphs for category B, C, D and E measurements wherein a similar geometrical compensation may be applied comprising a scaling of 0.010 and an offset of 0.113.

To perform the linear regression to obtain a trend for the data plotted in FIG. 3A the equation $\Sigma_i\ (s_A \times m_i + o_A - n_i)^2$ can be minimised, wherein s is the scaling factor, $m_i$ is the measured deviation from the expected dimension, $n_i$ is the expected dimension and o is the offset factor. In doing so, an offset factor, o, and the scaling factor, s, may be determined. However, this scaling and offset factor will be tailored to category A type dimensions, and does not take into account other dimension types.

FIG. 3B depicts measurements for category B dimensions, which when a positive offset is applied to object model data used to generate an object may be expected to decrease by an amount equal to the amount category A measurements increase. Therefore a trendline the data plotted in FIG. 3B can be obtained by minimising the equation $\Sigma_i(s_B \times m_i - o_B - n_i)^2$. This scaling and offset factor will be tailored to category B type dimensions, and does not take into account other dimension types.

FIG. 3C depicts measurements for category C dimensions, which are expected to be unaffected by application of an offset to object model data. Therefore, a trendline the data plotted in FIG. 3C may be obtained by minimising the equation $\Sigma_i(s_C \times m_i - n_i)^2$, noting the o term is missing. This scaling and offset factor will be tailored to category C type dimensions, and does not take into account other dimension types.

FIG. 3D depicts measurements for category D dimensions which when a positive offset is applied to object model data used to generate an object may be expected to decrease by an amount equal to half the amount category A measurements increase, as just one end of the measurement will be shifted by an offset, as opposed to both ends as seen with category A measurements. Therefore, a trendline for the data plotted in FIG. 3D may be obtained by minimising the equation $$\sum_i \left( s_D \times m_i - \frac{1}{2} o_D - n_i \right)^2.$$

This scaling and offset factor will be tailored to category D type dimensions, and does not take into account other dimension types.

FIG. 3E depicts measurements for category E dimensions, which, when a positive offset is applied to object model data used to generate an object may be expected to increase by an amount equal to half the amount category A measurements increase, as just one end of the measurement will be shifted by an offset, as opposed to both ends as seen with category A measurements. Therefore, a trendline for the data plotted in FIG. 3E may be obtained by minimising the equation $$\sum_i \left( s_E \times m_i + \frac{1}{2} o_E - n_i \right)^2.$$

This scaling and offset factor will be tailored to category E type dimensions, and does not take into account other dimension types.

Figure 4:
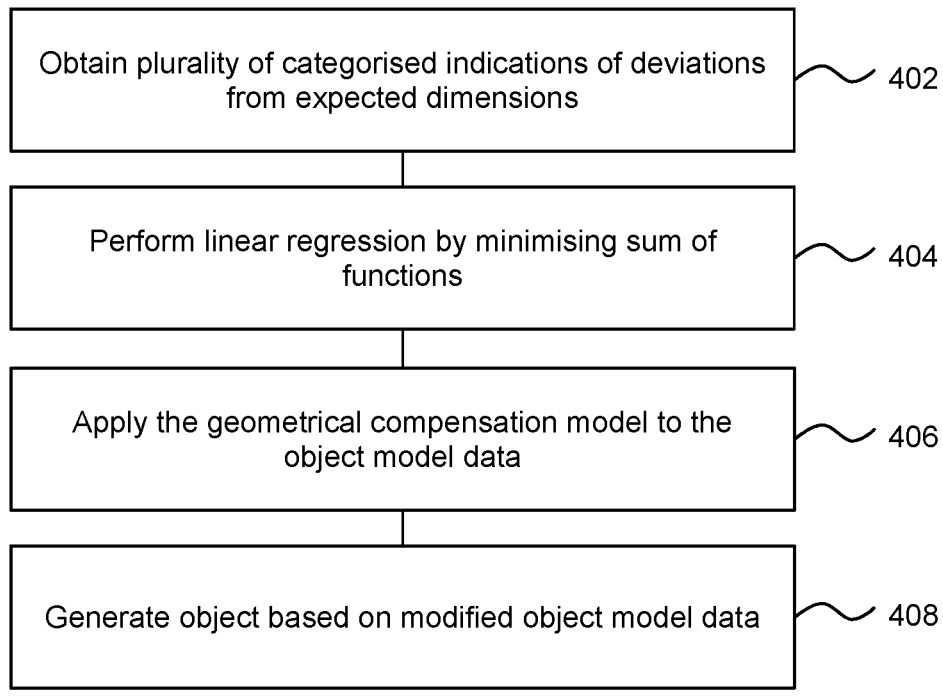
FIG. 4 is a flowchart of an example of a method of determining a geometrical compensation model.

FIG. 4 depicts an example method, which may be alongside the method of FIG. 1, and which describes how a scaling and offset factor which takes in all dimension types may be obtained. For example, such a method may be used to generate the scaling factor of 0.010 and the offset value of 0.113 mm as shown in FIG. 3A-E. The method may comprise a computer implemented method of determining a geometrical compensation model, which may for example be used to modify object model data. Block 402 corresponds to block 102 of FIG. 1 and comprises obtaining a plurality of categorised indications of deviations from expected dimensions for at least one object generated using an additive manufacturing apparatus. The category comprises at least one of a first dimension type, a second dimension type and a third dimension type.

In block 404 a geometrical compensation model is determined by performing a linear regression of expected values against the indications of the deviation for each category of measurements. The linear regression may be performed as described above for each category of dimension. However, in this example, the linear regression is performed by minimising a sum of functions, wherein each function is different and is determined by the expected values and indications of deviation for each category of measurements.

In some examples the functions to be minimised include at least one of the function for the category of dimensions between two non-surface points (category C dimensions) is $\Sigma_{c \in C}(m_c \times s - n_c)^2$, the function for the category of dimensions between one non-surface point and one internal face point (category D dimensions) is $$\sum_{d \in D} \left( m_d \times s - \frac{1}{2} o - n_d \right)^2,$$

and/or the function for the category of dimensions between one non-surface point and one external face point (category E dimensions) is $$\sum_{e \in E} \left( m_e \times s + \frac{1}{2} o - n_e \right)^2,$$

wherein s is the scaling factor, o is the offset factor, $m_i$ are measured dimensions, $n_i$ are expected dimensions, C is a set of measured dimensions with non-surface points at both ends thereof, D is a set of measured dimensions with a non-surface point and an interior surface at the ends thereof, E is a set of measured dimensions with a non-surface point and an exterior surface at the ends thereof. By performing the linear regression (i.e. by minimising the equation) the offset value, o, and the scaling factor, s, which take all dimension types into account may be determined. Such a scaling factor and offset value may be applied to an object as a whole (for example, without distinguishing between dimension types).

In some examples the sum of functions may be minimised, wherein the sum may be written as $$\sum_{a \in A}(m_a \times s + o - n_a)^2 + \sum_{b \in B}(m_b \times s - o - n_b)^2 +$$

$$\sum_{c \in C}(m_c \times s - n_c)^2 + \sum_{d \in D} \left( m_d \times s - \frac{1}{2} o - n_d \right)^2 + \sum_{e \in E} \left( m_e \times s + \frac{1}{2} o - n_e \right)^2$$

wherein in addition to the notation described above A is a set of measured dimensions with external surfaces at both ends thereof (category A dimensions), and B is a set of measured dimensions with internal surfaces at both ends thereof (category A dimensions), and so on. In a particular set of measurements, the size of at least one set may be 0. However, in examples, there may be at least one measurement in two categories, and in some examples there may be at least one measurement in set C, D or E. By minimising the sum of functions, the offset and scaling factors may be obtained for the object to be generated which result in scaling and offset factors which improve the dimensional accuracy of every type of dimension. By minimising this equation the offset factor, o, and the scaling factor, s, are determined, such that when the determined offset and scaling factors are applied to object model used to generate future objects to be generated their dimensions are accurately compensated such that the impact of distortions, such as shrinkage, may be reduced.

As briefly mentioned above, in practise, as deformations have been shown to be anisotropic in some examples, different scaling and offset factors may be determined for each axis, so that a set of compensations $[s_x, s_y, s_z, o_x, o_y, o_z]$ may be determined in the same way as outlined above, each from a set of measurements relating to a particular axis. In some examples, these may be associated with other factors, such as object type (e.g. object volume), object generation materials, object generation location, apparatus and/or apparatus parameters, and the like.

Block 406 comprises applying the geometrical compensation model to the object model data for generating objects. As described above, in some examples the geometrical compensation model comprises a scaling operation defined by a scaling factor and/or an offset operation defined by an offset value. In some examples, the same (single) scaling factor and/or the same (single) offset value may be used in relation to the object as a whole.

Applying the geometrical compensation model to object model data may comprise generating modified object model data. For example, this may comprise applying a scaling and/or offset to a mesh, or to a model describing the object as a plurality of voxels, or the like. In some examples, scaling may be applied to the mesh model, effectively changing the position of vertexes of the mesh in 3D space to increase or decrease the volume, and an offset may be applied to a voxelised model generated from the modified mesh model by adding or removing voxels from the surfaces.

The modified object model data may be processed to generate print instructions (or object generation instructions), which in some examples may specify an amount of print agent to be applied to each of a plurality of locations on a layer of build material. For example, generating print instructions may comprise determining 'slices' of a virtual fabrication chamber, and rasterising these slices into pixels (or voxels, i.e. three-dimensional pixels). An amount of print agent (or no print agent) may be associated with each of the pixels/voxels. For example, if a pixel/voxel relates to a region of a fabrication chamber which is intended to solidify, the print instructions may be generated to specify that fusing agent should be applied to a corresponding region of build material in object generation. If however a pixel/voxel relates to a region of the fabrication chamber which is intended to remain unsolidified, then print instructions may be generated to specify that no agent, or a coalescence modifying agent such as a detailing agent, may be applied thereto. In addition, the amounts of such agents may be specified in the print instructions and these amounts may be determined based on, for example, thermal considerations and the like.

Block 408 comprises generating an object based on object model data modified by the geometrical compensation, for example using print instructions generated as described above. For example, this may comprise forming a layer of build material, applying print agents, for example through use of 'inkjet' liquid distribution technologies in locations specified in the object model data for an object model slice corresponding to that layer using at least one print agent applicator, and applying energy, for example heat, to the layer. Some techniques allow for accurate placement of print agent on a build material, for example by using printheads operated according to inkjet principles of two-dimensional printing to apply print agents, which in some examples may be controlled to apply print agents with a resolution of around 600 dpi, or 1200 dpi. A further layer of build material may then be formed and the process repeated, for example with the object model data for the next slice.

In some examples, the methods set out herein may be combined with other methods of object model modification, which may include other object compensation models. However, there may be additional factors considered. For example, a modification function may be employed in the vicinity, or locality, of small features. An erosion of such small features may result in an unacceptable reduction in their size, either obliterating the feature or rendering it too small to fuse or too delicate to survive cleaning operations. For example, if a feature has a dimension of around 0.5 mm, this may correspond to 12 voxels at 600 dpi. If three or four voxels are eroded from the side of such a small feature, it will lose approximately 50 to 60% of its cross-section, reducing its size to less than 0.3 mm. Such a feature may be too small to survive cleaning operations. Thus, in some examples, other functions may be used to ensure that small features are preserved. In other examples, an intended location of object generation within a fabrication chamber may be considered, as deformations may be associated with locations. Other factors, such as choices of materials, apparatus parameters, environmental parameters (such as temperature, humidity and the like), etc. may be included in a compensation model.

Such a generated object may have improved dimensional accuracy relative to an object generated based on object model data without the modification provided by the scaling and offset operations.

Figure 5:
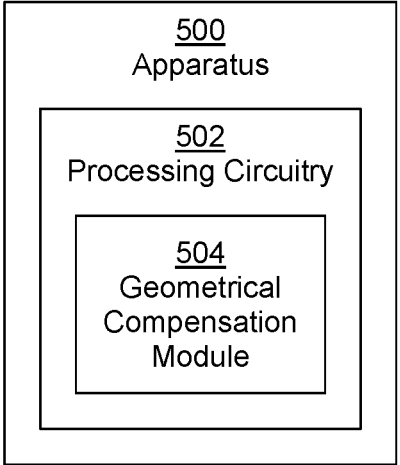
FIG. 5 is a simplified schematic of an example of apparatus for determining a geometrical compensation model.

FIG. 5 shows an apparatus 500 comprising processing circuitry 502. The processing circuitry 502 comprises a geometrical compensation module 504. In use of the apparatus 500, the geometrical compensation module 504 applies a compensation (e.g., a scaling and/or offset taken from a geometrical compensation model, or the like) to object model data describing an object to be generated in additive manufacturing to correct for anticipated variations in dimensions. In particular, in use of the apparatus 500 the geometrical compensation module 504 applies the compensation using a model derived using a plurality of categorised indications of deviations from expected dimensions for the object to be generated. In some examples, the indications of deviations may comprise at least one, or at least two, of: (i) indications of deviations from internal dimensions of the object (i.e. those which are expected to decrease when a positive surface offset is applied to object model data); (ii) indications of deviations from external dimensions of the object (i.e. those which are expected to increase when a positive surface offset is applied to object model data); and (iii) a dimension having, at at least one end thereof, a point which is a point which is expected to be unaffected by application of an offset to object model data used to generate the object from which the indication of deviation was obtained. It may be noted that a single dimension may fall into categories (i) and (iii) or into categories (ii) and (iii). Therefore, a single indication of deviation may provide at least two of the categories.

The model may have been derived using any of the principles described above in relation to FIGS. 1 to 4.

In some examples, in use of the apparatus 500, the geometrical compensation module 504 applies the compensation using a value to correct for anticipated variations (e.g., deviations) in a dimension of the object including a non-surface end-point. In some examples the value also compensates for anticipated variations in internal dimensions of the object and/or external dimensions of the object. The value may be a scaling factor and/or an offset value and may be determined as described above.

In some examples the apparatus 500 is an additive manufacturing apparatus. The additive manufacturing apparatus may further comprise a print instruction module, which in use of the additive manufacturing apparatus determines print instructions for generating the object from data representing a modified virtual object, i.e. object model data to which a compensation has been applied by the geometrical compensation module 504.

The print instructions (or object generation instructions) may, in use thereof, control the additive manufacturing apparatus 500 to generate each of a plurality of layers of the object. This may for example comprise specifying area coverage(s) for print agents such as fusing agents, colorants, detailing agents and the like. In some examples, object generation parameters are associated with object model sub-volumes (voxels or pixels). In some examples, the print instructions comprise a print agent amount associated with sub-volumes. In some examples, other parameters, such as any, or any combination of heating temperatures, build material choices, an intent of the print mode, and the like, may be specified. In some examples, halftoning may be applied to determine where to place fusing agent or the like.

In examples in which the apparatus 500 is an additive manufacturing apparatus, the additive manufacturing apparatus may, in use thereof, generate an object in a plurality of layers (which may correspond to respective slices of an object model) according to the print instructions. For example, this may comprise generating at least one object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. The apparatus 500 may comprise additional components not shown herein, for example any or any combination of a fabrication chamber, a print bed, printhead(s) for distributing print agents, a build material distribution system for providing layers of build material, energy sources such as heat lamps and the like.

Figure 6:
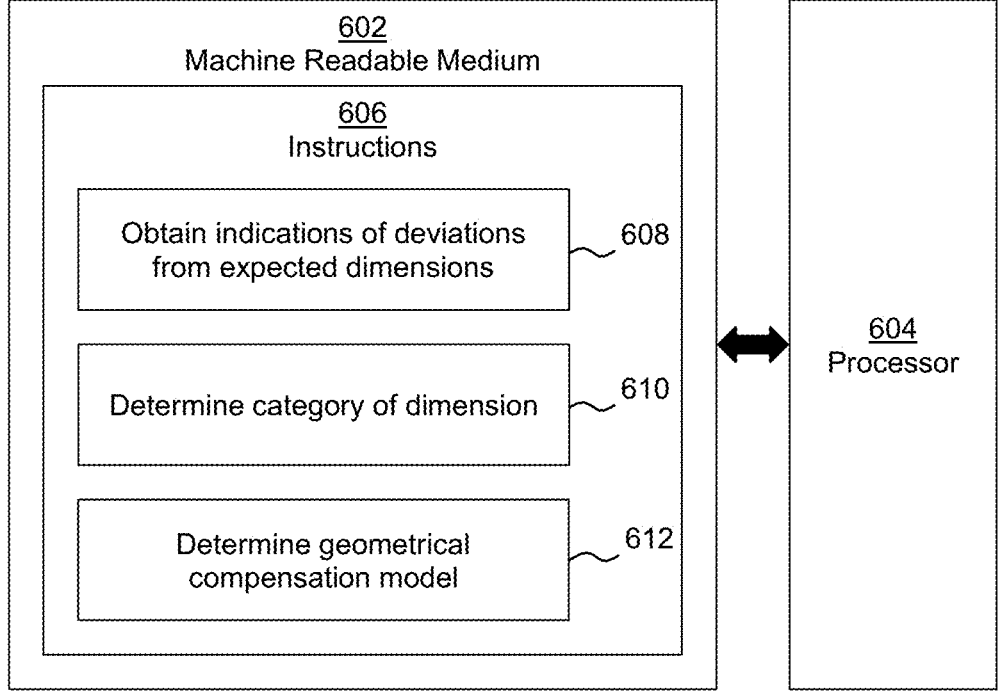
FIGS. 6 and 7 are simplified schematic drawings of an example machine-readable medium associated with a processor.

FIG. 6 shows a tangible machine-readable medium 602 associated with a processor 604. The machine-readable medium 602 comprises instructions 606 which, when executed by the processor 604, cause the processor 604 to carry out tasks. In this example, the instructions 606 comprise instructions 608 to cause the processor 604 to obtain a plurality of indications of deviations from expected dimensions for at least one object generated using an additive manufacturing apparatus. The indications may be obtained, for example, by retrieving the indications from a storage medium, over a network or the like, or by instructing a measuring device to perform measurements to be performed on objects.

The instructions 606 further comprise instructions 610 to determine, for each indication, a classification of the dimension, wherein the classification comprises at least one of an internal dimension, an external dimension and a dimension having, at an end thereof, a point which is expected to be unaffected by application of an offset to object model data used to generate the object. The plurality of indications may include at least one dimension measured from a point which is unaffected by application of an offset in some examples.

Determining a classification may include, for example, reviewing a data tag or label provided in object model data identifying the category, or analyzing the object model data for example using vectors as described above, or in some other way.

The instructions 606 further comprise instructions 612 to determine, based on the obtained indications and the associated classification, a geometrical compensation model to apply to object model data for generating objects using additive manufacturing to compensate for anticipated deviations in dimensions.

In some examples, the geometrical transformation model comprises at least one of a scaling (e.g., scaling factor) and an offset (e.g., an offset value).

In some examples, the instructions when executed cause the processor 604 to carry out any or any combination of the blocks of FIG. 1 and/or the blocks of FIG. 4. In some examples, the instructions may cause the processor 604 to act as any part of the processing circuitry 502 of FIG. 5.

Figure 7:
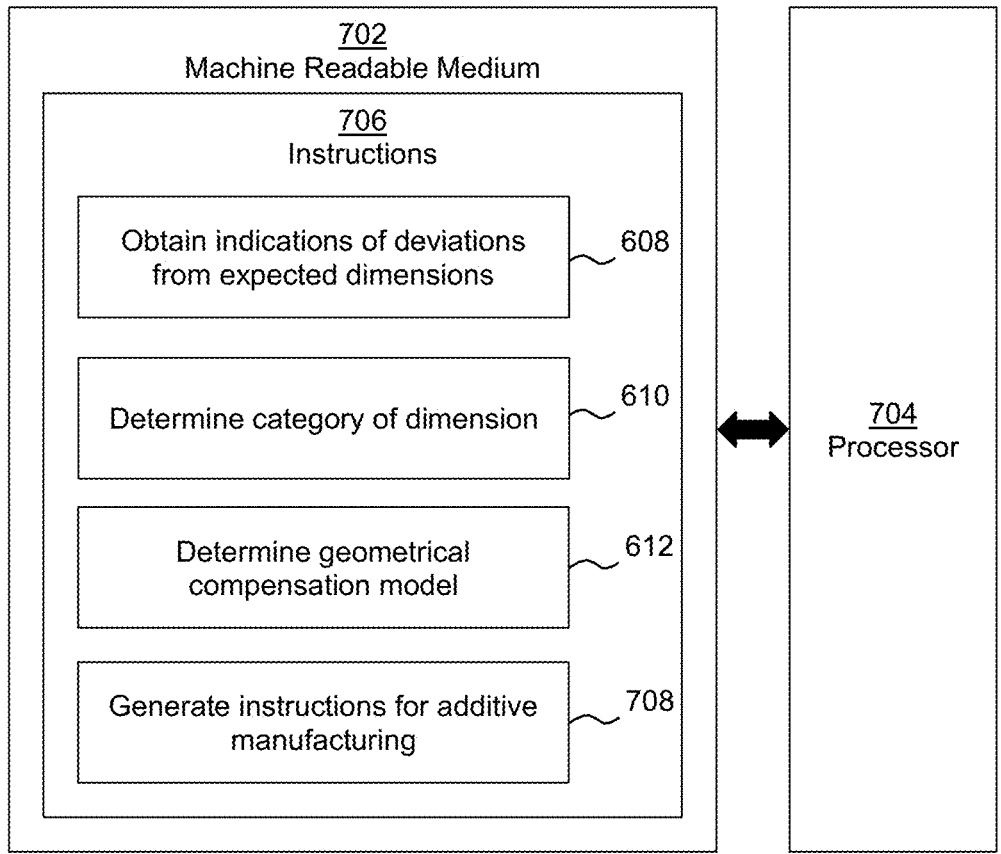

FIG. 7 shows a further example of a tangible machine-readable medium 702 associated with a processor 704. The machine-readable medium 702 comprises instructions 706 which, when executed by the processor 704, cause the processor 704 to carry out tasks. In this example, the instructions 706 comprise instructions 608, instructions 610 and instructions 612 as described in relation to FIG. 6. The instructions 706 further comprise instructions 708 to generate instructions for an additive manufacturing apparatus, which instruct the additive manufacturing apparatus to build an object based on object model data modified using the geometrical transformation model. When such generated instructions are executed by the additive manufacturing apparatus, an object is built by the additive manufacturing apparatus which has improved dimensional accuracy relative to object model data which is not modified as described herein.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:

receiving, by a processor, object model data for an object, wherein the object is to be additively manufactured by an additive-manufacturing apparatus depositing layers of build material, selectively applying fusing agent to the layers on a layer-by-layer basis in accordance with the object model data, and selectively fusing the build material via energy application, wherein the fusing agent promotes fusing of the build material during the energy application by absorbing the energy, wherein the object model data specifies a nominal value of each first dimension of a plurality of first dimensions of the object, each first dimension being defined between a first external surface point of the object and a first non-surface point of the object, and wherein either or both of:

when the fusing agent is applied to the build material in regions that are to be fused, but the build material in neighboring regions that are not to be fused become sufficiently heated during the energy application to also fuse, each first dimension of one or more of the first dimensions is greater than the nominal value, as first dimensional deformation when the object is additively manufactured, and after the fusing agent is selectively applied to the build material and the build material is selectively fused via the energy application, and some of the build material shrinks during subsequent cooling, each first dimension of one or more other of the first dimensions is smaller than the nominal value, as second dimensional deformation when the object is additively manufactured;

generating, by the additive manufacturing apparatus, the object using the object model data, such that either or both of the first and second dimensional deformations occur;

determining, by the processor, a deviation between the nominal value and an actual value of each first dimension of the object as generated from the object model data, wherein the actual value for each of at least one of the first dimensions is greater or smaller than the nominal value per the first or second dimensional deformation, respectively;

based on the determined deviation for each first dimension, determining, by the processor, a scaling factor and a positive offset factor that minimizes a sum of first squared quantities corresponding to the first dimensions, wherein each first squared quantity comprises a product of the actual value of a corresponding first dimension and the scaling factor, plus half of the offset factor, minus the nominal value of the corresponding first dimension;

modifying, by the processor, the object model data, using the scaling factor and the positive offset factor to compensate for either or both of the first and second dimensional deformation when the additive manufacturing apparatus generates the object again; and generating, by the additive manufacturing apparatus, the object using the modified object model data, such that modification of the object model data and usage of the modified object model data to generate the object again at least ameliorates either or both of the first and second dimensional deformations, improving dimensional accuracy of the generated object.

2. The method of claim 1, wherein the object model data further specifies a nominal value of each second dimension of one or more second dimensions of the object, each second dimension defined between a second internal surface point of the object and a second non-surface point of the object, wherein the method further comprises determining, by the processor, a deviation between the nominal value and an actual value of each second dimension of the object as generated from the object model data using the additive manufacturing apparatus, wherein the scaling factor and the positive offset factor are determined based further on the determined deviation for each second dimension to minimize the sum of the first squared quantities, plus a sum of one or more second square quantities corresponding to the one or more second dimensions, and wherein each second squared quantity comprises a product of the actual value of a corresponding second dimension and the scaling factor, minus half of the offset factor, minus the nominal value of the corresponding second dimension.

3. The method of claim 1, wherein the object model data further specifies a nominal value of each third dimension of one or more third dimensions of the object, each third dimension defined between a pair of third non-surface points of the object, wherein the method further comprises determining, by the processor, a deviation between the nominal value and an actual value of each third dimension of the object as generated from the object model data using the additive manufacturing apparatus, wherein the scaling factor and the positive offset factor are determined based further on the determined deviation for each third dimension to minimize the sum of the first squared quantities, plus a sum of one or more third square quantities corresponding to the one or more third dimensions, and wherein each third squared quantity comprises a product of the actual value of a corresponding third dimension and the scaling factor, minus the nominal value of the corresponding third dimension.

4. The method of claim 3, wherein the object model data further specifies a nominal value of each second dimension of one or more second dimensions of the object, each second dimension defined between a second internal surface point of the object and a second non-surface point of the object, wherein the method further comprises determining, by the processor, a deviation between the nominal value and an actual value of each second dimension of the object as generated from the object model data using the additive manufacturing apparatus, wherein the scaling factor and the positive offset factor are determined based further on the determined deviation for each second dimension to minimize the sum of the first squared quantities, plus a sum of one or more second square quantities corresponding to the one or more second dimensions, plus the sum of the one or more third squared quantities, and wherein each second squared quantity comprises a product of the actual value of a corresponding second dimension and the scaling factor, minus half of the offset factor, minus the nominal value of the corresponding second dimension.

5. The method of claim 1, wherein the object model data further specifies a nominal value of each fourth dimension of one or more fourth dimensions of the object, each fourth dimension defined between a pair of fourth external surface points of the object, wherein the method further comprises determining, by the processor, a deviation between the nominal value and an actual value of each fourth dimension of the object as generated from the object model data using the additive manufacturing apparatus, wherein the scaling factor and the positive offset factor are determined based further on the determined deviation for each fourth dimension to minimize the sum of the first squared quantities, plus a sum of one or more fourth square quantities corresponding to the one or more fourth dimensions, and wherein each fourth squared quantity comprises a product of the actual value of a corresponding fourth dimension and the scaling factor, plus the offset, minus the nominal value of the corresponding fourth dimension.

6. The method of claim 1, wherein the object model data further specifies a nominal value of each fifth dimension of one or more fifth dimensions of the object, each fifth dimension defined between a pair of fifth internal surface points of the object, wherein the method further comprises determining, by the processor, a deviation between the nominal value and an actual value of each fifth dimension of the object as generated from the object model data using the additive manufacturing apparatus, wherein the scaling factor and the positive offset factor are determined based further on the determined deviation for each fifth dimension to minimize the sum of the first squared quantities, plus a sum of one or more fifth square quantities corresponding to the one or more fifth dimensions, and wherein each fifth squared quantity comprises a product of the actual value of a corresponding fifth dimension and the scaling factor, minus the offset, minus the nominal value of the corresponding fifth dimension.

7. The method of claim 6, wherein the object model data further specifies a nominal value of each fourth dimension of one or more fourth dimensions of the object, each fourth dimension defined between a pair of fourth external surface points of the object, wherein the method further comprises determining, by the processor, a deviation between the nominal value and an actual value of each fourth dimension of the object as generated from the object model data using the additive manufacturing apparatus, wherein the scaling factor and the positive offset factor are determined based further on the determined deviation for each fourth dimension to minimize the sum of the first squared quantities, plus a sum of the one or more fifth squared quantities, plus a sum of one or more fourth square quantities corresponding to the one or more fourth dimensions, and wherein each fourth squared quantity comprises a product of the actual value of a corresponding fourth dimension and the scaling factor, plus the offset, minus the nominal value of the corresponding fourth dimension.

8. A system comprising:

a processor; and a memory storing instructions executable by the processor to:

receive object model data for an object specifying a nominal value of each second dimension of one or more second dimensions of the object, each second dimension defined between a second internal surface point of the object and a second non-surface point of the object;

determine a deviation between the nominal value and an actual value of each second dimension of the object as generated from the object model data using an additive manufacturing apparatus;

based on the determined deviation for each first dimension, determine a scaling factor and a positive offset factor that minimizes a sum of one or more second squared quantities corresponding to the one or more second dimensions, wherein each second squared quantity comprises a product of the actual value of a corresponding second dimension and the scaling factor, minus half of the offset factor, minus the nominal value of the corresponding second dimension;

modify the object model data, using the scaling factor and the positive offset factor; and cause the additive manufacturing apparatus to generate the object using the modified object model data to compensate for expected dimensional deformation to improve dimensional accuracy of the generated object.

9. The system of claim 8, wherein the object model data further specifies a nominal value of each first dimension of one or more first dimensions of the object, each first dimension defined between a first external surface point of the object and a first non-surface point of the object, wherein the instructions are executable by the processor to further determine a deviation between the nominal value and an actual value of each first dimension of the object as generated from the object model data using the additive manufacturing apparatus, wherein the scaling factor and the positive offset factor are determined based further on the determined deviation for each first dimension to minimize the sum of the one or more second squared quantities, plus a sum of one or more first square quantities corresponding to the one or more first dimensions, and wherein each first squared quantity comprises a product of the actual value of a corresponding first dimension and the scaling factor, plus half of the offset factor, minus the nominal value of the corresponding first dimension.

10. The system of claim 8, wherein the object model data further specifies a nominal value of each third dimension of one or more third dimensions of the object, each third dimension defined between a pair of third non-surface points of the object, wherein the instructions are executable by the processor to further determine a deviation between the nominal value and an actual value of each third dimension of the object as generated from the object model data using the additive manufacturing apparatus, wherein the scaling factor and the positive offset factor are determined based further on the determined deviation for each third dimension to minimize the sum of the one or more second squared quantities, plus a sum of one or more third square quantities corresponding to the one or more third dimensions, and wherein each third squared quantity comprises a product of the actual value of a corresponding third dimension and the scaling factor, minus the nominal value of the corresponding third dimension.

11. The system of claim 10, wherein the object model data further specifies a nominal value of each first dimension of one or more first dimensions of the object, each first dimension defined between a first external surface point of the object and a first non-surface point of the object, wherein the instructions are executable by the processor to further determine a deviation between the nominal value and an actual value of each first dimension of the object as generated from the object model data using the additive manufacturing apparatus, wherein the scaling factor and the positive offset factor are determined based further on the determined deviation for each first dimension to minimize the sum of the one or more second squared quantities, plus the sum of the one or more third square quantities, plus a sum of one or more first square quantities corresponding to the one or more first dimensions, and wherein each first squared quantity comprises a product of the actual value of a corresponding first dimension and the scaling factor, plus half of the offset factor, minus the nominal value of the corresponding first dimension.

12. The system of claim 8, wherein the object model data further specifies a nominal value of each fourth dimension of one or more fourth dimensions of the object, each fourth dimension defined between a pair of fourth external surface points of the object, wherein the instructions are executable by the processor to further determine a deviation between the nominal value and an actual value of each fourth dimension of the object as generated from the object model data using the additive manufacturing apparatus, wherein the scaling factor and the positive offset factor are determined based further on the determined deviation for each fourth dimension to minimize the sum of the one or more second squared quantities, plus a sum of one or more fourth square quantities corresponding to the one or more fourth dimensions, and wherein each fourth squared quantity comprises a product of the actual value of a corresponding fourth dimension and the scaling factor, plus the offset, minus the nominal value of the corresponding fourth dimension.

13. The system of claim 8, wherein the object model data further specifies a nominal value of each fifth dimension of one or more fifth dimensions of the object, each fifth dimension defined between a pair of fifth internal surface points of the object, wherein the instructions are executable by the processor to further determine a deviation between the nominal value and an actual value of each fifth dimension of the object as generated from the object model data using the additive manufacturing apparatus, wherein the scaling factor and the positive offset factor are determined based further on the determined deviation for each fifth dimension to minimize the sum of the one or more second squared quantities, plus a sum of one or more fifth square quantities corresponding to the one or more fifth dimensions, and wherein each fifth squared quantity comprises a product of the actual value of a corresponding fifth dimension and the scaling factor, minus the offset, minus the nominal value of the corresponding fifth dimension.

14. The system of claim 13, wherein the object model data further specifies a nominal value of each fourth dimension of one or more fourth dimensions of the object, each fourth dimension defined between a pair of fourth external surface points of the object, wherein the instructions are executable by the processor to further determine a deviation between the nominal value and an actual value of each fourth dimension of the object as generated from the object model data using the additive manufacturing apparatus, wherein the scaling factor and the positive offset factor are determined based further on the determined deviation for each fourth dimension to minimize the sum of the one or more second squared quantities, plus a sum of the one or more fifth squared quantities, plus a sum of one or more fourth square quantities corresponding to the one or more fourth dimensions, and wherein each fourth squared quantity comprises a product of the actual value of a corresponding fourth dimension and the scaling factor, plus the offset, minus the nominal value of the corresponding fourth dimension.

15. The system of claim 8, further comprising the additive manufacturing apparatus.

16. A non-transitory machine-readable medium storing instructions executable by a processor to perform processing comprising:

receiving object model data for an object specifying a nominal value of each first dimension of one or more third dimensions of the object, each third dimension defined between a pair of third non-surface points of the object;

determining a deviation between the nominal value and an actual value of each third dimension of the object as generated from the object model data using an additive manufacturing apparatus;

based on the determined deviation for each third dimension, determining, by the processor, a scaling factor that minimizes a sum of one or more third squared quantities corresponding to the one or more third dimensions, wherein each third squared quantity comprises a product of the actual value of a corresponding third dimension and the scaling factor, minus the nominal value of the corresponding third dimension;

modifying the object model data, using the scaling factor; and sending the modified object model data to the additive manufacturing apparatus to generate the object from the modified object model data, wherein modification of the object model data improves dimensional accuracy of the object that is generated by the additive manufacturing apparatus by compensating for expected dimensional deformation during generation of the object by the additive manufacturing apparatus.

17. The non-transitory machine-readable medium of claim 16, wherein the object model data further specifies a nominal value of each first dimension of one or more first dimensions of the object, each first dimension defined between a first external surface point of the object and a first non-surface point of the object, wherein the processing further comprises determining a deviation between the nominal value and an actual value of each first dimension of the object as generated from the object model data using the additive manufacturing apparatus, wherein the scaling factor and a positive offset factor are determined based on the determined deviation for each third dimension and the determined deviation for each first dimension to minimize the sum of the one or more third squared quantities, plus a sum of one or more first square quantities corresponding to the one or more first dimensions, wherein the object model data is modified based on both the scaling factor and the positive offset factor, and wherein each first squared quantity comprises a product of the actual value of a corresponding first dimension and the scaling factor, plus half of the offset factor, minus the nominal value of the corresponding first dimension.

18. The non-transitory machine-readable medium of claim 16, wherein the object model data further specifies a nominal value of each second dimension of one or more second dimensions of the object, each second dimension defined between a second internal surface point of the object and a second non-surface point of the object, wherein the processing further comprises determining a deviation between the nominal value and an actual value of each second dimension of the object as generated from the object model data using the additive manufacturing apparatus, wherein the scaling factor and a positive offset factor are determined based on the determined deviation for each third dimension and the determined determination for each second dimension to minimize the sum of the one or more third squared quantities, plus a sum of one or more second square quantities corresponding to the one or more second dimensions, wherein the object model data is modified based on both the scaling factor and the positive offset factor, and wherein each second squared quantity comprises a product of the actual value of a corresponding second dimension and the scaling factor, minus half of the offset factor, minus the nominal value of the corresponding second dimension.

19. The non-transitory machine-readable medium of claim 16, wherein the object model data further specifies a nominal value of each fourth dimension of one or more fourth dimensions of the object, each fourth dimension defined between a pair of fourth external surface points of the object, wherein the processing further comprises determining a deviation between the nominal value and an actual value of each fourth dimension of the object as generated from the object model data using the additive manufacturing apparatus, wherein the scaling factor and a positive offset factor are determined based on the determined deviation for each third dimension and the determined determination for each fourth dimension to minimize the sum of the one or more third squared quantities, plus a sum of one or more fourth square quantities corresponding to the one or more fourth dimensions, wherein the object model data is modified based on both the scaling factor and the positive offset factor, and wherein each fourth squared quantity comprises a product of the actual value of a corresponding fourth dimension and the scaling factor, plus the offset, minus the nominal value of the corresponding fourth dimension.

* * * * *